(12) United States Patent
Spain et al.

(10) Patent No.: US 7,025,357 B2
(45) Date of Patent: Apr. 11, 2006

(54) SHAFT SEAL HAVING LIP SUPPORTS

(75) Inventors: Andrew C. Spain, Concord, NH (US); Robert P. LaPlante, Gilford, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 10/165,075

(22) Filed: Jun. 7, 2002

(65) Prior Publication Data

US 2002/0185822 A1 Dec. 12, 2002

Related U.S. Application Data

(60) Provisional application No. 60/297,234, filed on Jun. 8, 2001.

(51) Int. Cl.
*F16J 15/32* (2006.01)

(52) U.S. Cl. .................. 277/569; 277/559; 277/584; 277/549

(58) Field of Classification Search ............... 277/559, 277/560, 569–577, 549, 584
See application file for complete search history.

(56) References Cited

U.S. PATENT DOCUMENTS

| | | | | |
|---|---|---|---|---|
| 2,146,677 A | * | 2/1939 | Johnson | 277/575 |
| 2,227,771 A | * | 1/1941 | Victor | 277/569 |
| 2,804,325 A | * | 8/1957 | Riesing | 277/559 |
| 2,872,229 A | * | 2/1959 | Waser | 277/564 |
| 2,966,376 A | * | 12/1960 | Reynolds | 277/550 |
| 3,394,939 A | * | 7/1968 | Mastro | 277/309 |
| 3,511,512 A | * | 5/1970 | Wheelock | 277/564 |
| 4,039,197 A | * | 8/1977 | Schmidt et al. | 277/580 |
| 4,119,324 A | * | 10/1978 | Denton et al. | 277/559 |
| 4,300,778 A | * | 11/1981 | Gagne | 277/568 |
| 4,304,414 A | * | 12/1981 | Forch | 277/575 |
| 4,336,945 A | * | 6/1982 | Christiansen et al. | 277/559 |
| 4,834,397 A | * | 5/1989 | Shimasaki et al. | 277/564 |

(Continued)

FOREIGN PATENT DOCUMENTS

DE 4105746 A1 * 8/1991

(Continued)

OTHER PUBLICATIONS

Merriam-Webster Online, Dictionary.com, Cambridge Dictionary.*

*Primary Examiner*—Jack W. Lavinder
(74) *Attorney, Agent, or Firm*—Ronald W. Wangerow; A. Michael Tucker; Harness, Dickey & Pierce, P.L.C.

(57) ABSTRACT

A shaft seal includes an elastomeric annular body having an outwardly protruding annular lip. An annular outer case is embedded into the body. An annular insert is positioned adjacent the outer case. An annular inner case is embedded into the body adjacent the insert. The outer case, the insert, and the inner case support the lip.

21 Claims, 2 Drawing Sheets

U.S. PATENT DOCUMENTS

| | | | |
|---|---|---|---|
| 5,083,802 A * | 1/1992 | Shimasaki et al. | 277/560 |
| 5,149,106 A * | 9/1992 | Takenaka et al. | 277/556 |
| 5,456,475 A * | 10/1995 | Abraham et al. | 210/171 |
| 5,501,469 A * | 3/1996 | Ducugnon et al. | 277/551 |
| 5,509,666 A * | 4/1996 | Abraham et al. | 277/562 |
| 5,511,886 A * | 4/1996 | Sink | 384/486 |
| 5,649,710 A * | 7/1997 | Kanda | 277/371 |
| 5,730,444 A * | 3/1998 | Notter | 277/554 |
| 6,050,570 A * | 4/2000 | Otto | 277/351 |
| 6,334,618 B1 * | 1/2002 | Ohta et al. | 277/549 |
| 6,367,811 B1 * | 4/2002 | Hosokawa et al. | 277/560 |
| 6,401,322 B1 * | 6/2002 | Matsushima | 29/460 |
| 6,481,720 B1 * | 11/2002 | Yoshida et al. | 277/400 |
| 6,517,082 B1 * | 2/2003 | Yamada et al. | 277/559 |
| 6,543,786 B1 * | 4/2003 | Osumi et al. | 277/549 |
| 6,565,096 B1 * | 5/2003 | Ikeda et al. | 277/551 |
| 6,666,459 B1 * | 12/2003 | Hufnagel | 277/572 |
| 2002/0003337 A1 * | 1/2002 | Yamada et al. | 277/559 |

FOREIGN PATENT DOCUMENTS

| | | |
|---|---|---|
| DE | 4018216 A1 * | 12/1991 |
| EP | 0207191 A2 * | 10/1985 |
| JP | 02134472 A * | 5/1990 |
| JP | 03189480 A * | 8/1991 |
| JP | 03265766 A * | 11/1991 |
| WO | WO 8705979 * | 10/1987 |

* cited by examiner

SHAFT SEAL HAVING LIP SUPPORTS

CROSS REFERENCE TO RELATED APPLICATION

This application claims the benefit of U.S. provisional patent application identified as application Ser. No. 60/297,234, filed Jun. 8, 2001.

BACKGROUND OF THE INVENTION

This invention relates in general to seals for use in sealing a lubricant about a rotating element, such as a shaft. More specifically, this invention relates to a shaft seal of the type having a flexible lip that contacts the rotating shaft.

A flexible lip protrudes outwardly from an elastomeric body to form a lip seal for sealing about a rotating shaft. A lip seal retains lubricant on an oil side of the seal and prevents the entry of contaminants from an air side of the seal.

A lip of such a shaft seal is subjected to bending loads and stresses, which reduce the life of the lip. Oftentimes, the lip is integrally molded with the body from an elastomeric material such as rubber.

BRIEF SUMMARY OF THE INVENTION

The present invention includes a shaft seal having a lip. A plurality of supports are provided to support the lip and increase its effective life. An outer case, an insert, and an inner case are embedded in a body to provide lip supports.

In a preferred embodiment, a shaft seal includes an elastomeric annular body having an outwardly protruding annular lip. An annular outer case is embedded into the body. An annular insert is positioned adjacent the outer case. An annular inner case is embedded into the body adjacent the insert. The outer case, the insert, and the inner case support the lip.

DETAILED DESCRIPTION OF THE PREFERRED EMBODIMENT

Figure 1:
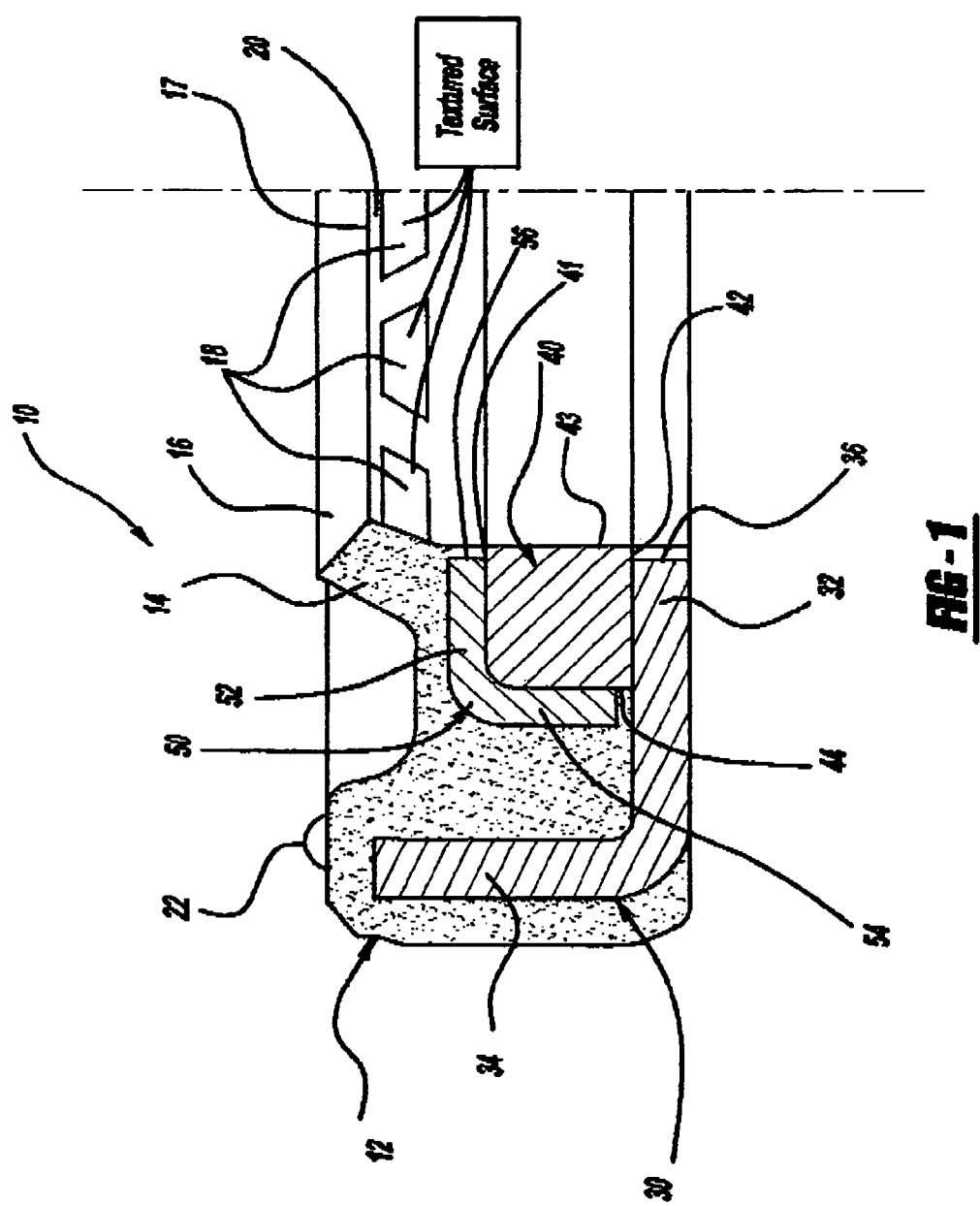
FIG. 1 is a sectional, partial view of a shaft seal according to this invention.
Figure 2:
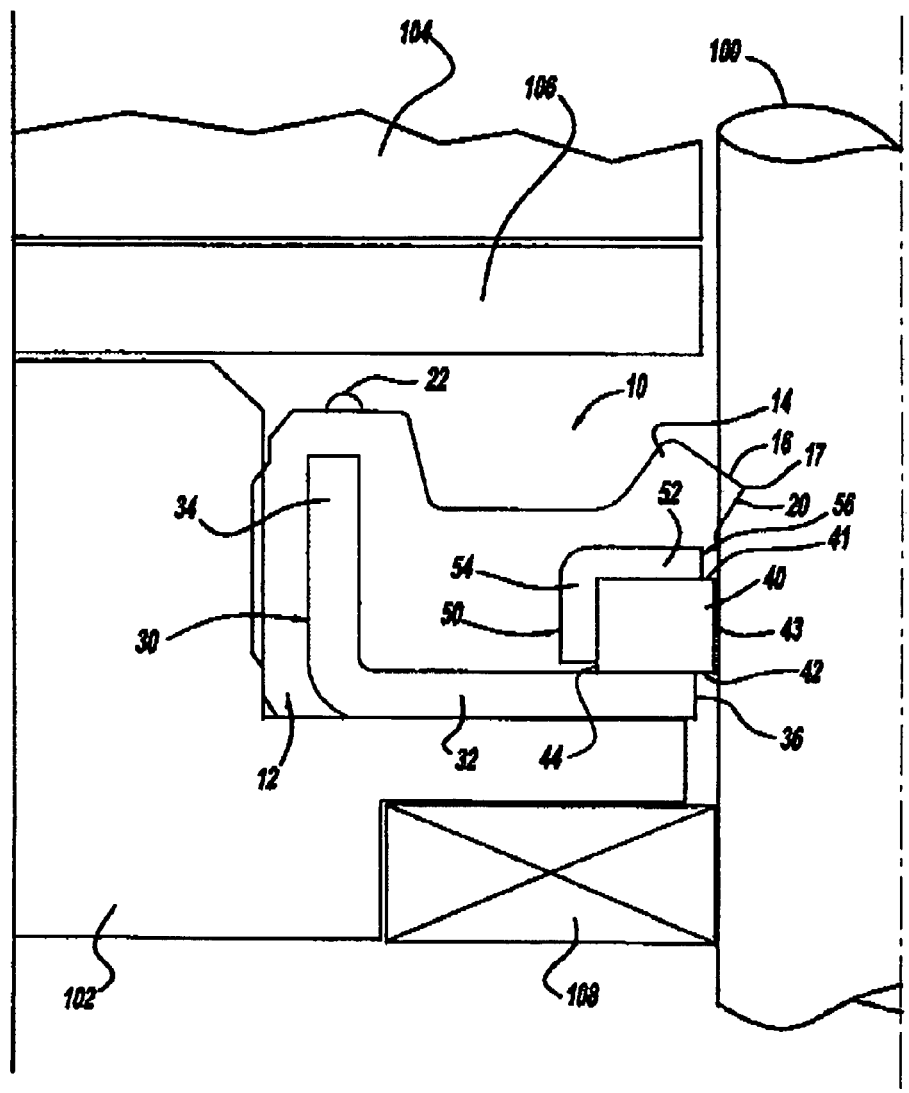
FIG. 2 is a sectional, partial view of the shaft seal of FIG. 1 mounted on a shaft according to this invention.

A shaft seal 10 according to this invention is illustrated in FIGS. 1 and 2. The shaft seal 10 retains lubricant about a rotating shaft 100, illustrated only in FIG. 2. The shaft seal 10 includes multiple lip support elements to prevent catastrophic failure and subsequent loss of lubricant about the shaft 100.

The shaft 100 is mounted in or through a bore of a housing 102. A bearing 104 and a bearing race 106 can be provided about the shaft 100 on the side of the shaft seal 10. An excluder seal 108 can be provided about the shaft 100 on an opposite side of the shaft seal 10.

The shaft seal 10 includes an elastomeric annular body 12 having an outwardly protruding annular lip 14 that terminates in an end surface 16 having a sealing edge 17. The lip 14 engages the shaft 100 and retains a desired lubricant. Preferably, a plurality of raised or extended areas or pads 18 are formed on an inner surface of the lip 14. The pads 18 form textured areas that trap lubricant, which aids in the prevention of wear of the lip 14. Preferably, the pads 18 are spaced axially away from the sealing edge 17 to provide a smooth, annular contact surface 20 that engages the shaft 100. The contact surface 20 provides a continuous positive contact with the shaft 100 to eliminate leaks about the shaft 100.

Preferably, the body 12 is molded from a desired material, including rubber. If desired, a plurality of raised portions or bumps 22 can be formed on the body 12. These anti-stick bumps 22 prevent seals 10 from sticking to one another during handling, packaging, shipping, and storage. If desired, the bumps 22 and the pads 18 can be molded into the body 12.

A ring-like outer case 30 is embedded into the body 12. The outer case 30 includes a radial portion 32 and an axial portion 34. The radial portion 32 terminates in an end surface 36 facing the shaft 100. Preferably, the end surface 36 is spaced relatively close to the shaft 100, but does not contact the shaft 100. The radial portion 32 provides support for insert 40 to reduce and/or eliminate extrusion of the lip 14 during a molding process. In this manner, the radial portion 32 provides a first lip support.

A ring-like insert 40 provides a second lip support to reduce and/or eliminate extrusion of the lip 14. Preferably, the insert 40 is formed from a low-friction material such as polytetrafluoroethylene (PTFE). The insert 40 includes a first radial surface 41 spaced from a second radial surface 42. The insert 40 also includes a first axial or circumferential surface 43 that engages the shaft 100 spaced from a second axial or circumferential surface 44. Preferably, the second radial surface 42 is adjacent to and is supported by the radial portion 32 of the outer case 30.

A ring-like inner case 50 is embedded into the body and provides a third lip support. The inner case 50 includes a radial portion 52 and an axial portion 54. The radial portion 52 terminates in an end surface 56, which forms an inner diameter of the case 50, facing the shaft 100. Preferably, the end surface 56 is spaced radially outwardly from the first circumferential surface 43 of the insert 40 to prevent contact between the inner case 50 and the shaft 100 and to minimize pressure concentration at this point. Additionally, the end surface 56 is spaced radially outwardly from the shaft 100 to provide a hinge area for the lip 14 that enhances the lip contact loading. This enhanced lip contact loading provides a load that is concentrated at the sealing edge 17 and at the continuous contact surface 20 to provide an effective seal about the shaft 100.

The radial portion 52 extends over a majority of a radial length of the insert 40. The axial portion 54 extends over a majority of an axial length of the insert 40. In this manner, the inner case 50 insulates the insert 40 from forces and pressures of an application. The inner case 50 also evenly distributes axial forces to the insert 40.

Preferably, the outer case 30, the insert 40, and the inner case 50 are molded into the body 12. In this manner, assembly tolerances from prior art techniques of high-pressure shaft seals are eliminated.

The outer case 30 and the inner case 50 can be formed from any desired load bearing material, including metal and metal alloys.

The shaft seal 10 can be used in an application with little or no pressure, and in high-pressure applications beyond 1000 psi and more than approximately 3000 psi. The outer case 30, the insert 40, and the inner case 50 provide three separate lip supports that prevent catastrophic failure of the shaft seal 10.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A shaft seal comprising:
   an elastomeric annular body having an outwardly protruding annular lip;
   an annular outer case embedded into the body, the outer case includes a radial portion and an axial portion integrally formed as a unitary piece;
   an annular insert positioned immediately adjacent the radial portion of said outer case; and
   an annular inner case embedded into and in contact with the body adjacent the insert, the inner case includes a radial portion and an axial portion, the radial portion of the inner case having at least one radial surface extending generally radially and the axial portion of the inner case having at least one axial surface extending generally axially, wherein the radial and axial surfaces are positioned immediately adjacent the insert.

2. The shaft seal specified in claim 1 wherein:
   the insert includes an inner circumferential surface;
   the radial portion of the outer case terminates in an end surface spaced radially outwardly from the inner circumferential surface of the insert; and
   the radial portion of the inner case terminates in an end surface spaced radially outwardly from the inner circumferential surface of the insert.

3. The shaft seal specified in claim 1 wherein the radial portion of the inner case extends over a majority of a radial length of the insert.

4. The shaft seal specified in claim 1 wherein the axial portion of the inner case extends over a majority of an axial length of the insert.

5. The shaft seal specified in claim 1 wherein the radial portion of the outer case extends over a majority of a radial length of the insert.

6. The shaft seal specified in claim 1 wherein the annular lip terminates in an outer edge, and wherein a plurality of pads are formed on an inner surface of the annular lip and axially spaced away from the outer edge.

7. The shaft seal in claim 6 wherein the pads include a textured surface.

8. The shaft seal specified in claim 1 wherein the insert is formed from a low-friction material.

9. The shalt seal specified in claim 1 wherein each of the outer case and the inner case is formed from a load bearing material.

10. The shaft seal specified in claim 1 wherein the outer case, the insert, and the inner case are molded into the body and support the lip.

11. A shaft seal and shaft assembly including:
    a body having a lip in contact with the shaft;
    an outer case having an axial portion having radially inner and outer surfaces embedded into the body and a radial portion disposed against said body;
    an insert provided immediately adjacent the radial portion of said outer case; and
    an inner case embedded into and in contact with the body and including an axial portion having at least one axial surface extending generally axially and a radial portion having at least one radial surface extending generally radially, wherein said axial surface is disposed immediately adjacent to an outermost surface of said insert and said radial surface is disposed immediately adjacent to said insert opposite said radial portion of said outer case.

12. The shaft seal specified in claim 11 wherein:
    the insert includes an inner circumferential surface adjacent the shaft;
    the radial portion of the outer case terminates in an end surface spaced radially outwardly from the inner circumferential surface of the insert and not in contact with the shaft; and
    the radial portion of the inner case terminates in an end surface spaced radially outwardly from the inner circumferential surface of the insert and not in contact with the shaft.

13. The shaft seal and shaft assembly specified in claim 11 wherein the radial portion of the inner case extends over a majority of a radial length of the insert.

14. The shaft seal and shaft assembly specified in claim 11 wherein the axial portion of the inner case extends over a majority of an axial length of the insert.

15. The shaft seal and shaft assembly specified in claim 11 wherein the radial portion of the outer case extends over a majority of a radial length of the insert.

16. The shaft seal and shaft assembly specified in claim 11 wherein the lip terminates in an outer edge in contact with the shaft, and wherein a plurality of pads are formed on an inner surface of the lip and axially spaced away from the edge.

17. The shaft seal and shaft assembly specified in claim 16 wherein the pads include a textured surface.

18. The shaft seal and shaft assembly specified in claim 11 wherein the outer case, the insert, and the inner case are molded into the body and support the lip.

19. A shaft seal comprising:
    a unitary elastomeric annular body having an outwardly protruding annular lip formed integrally with the unitary elastomeric annular body;
    an annular outer case having an axial portion embedded into the unitary elastomeric annular body and a radial portion extending from said axial portion;
    an annular insert positioned immediately adjacent the radial portion of said outer case; and
    an annular inner case disposed within the unitary elastomeric annular body and including an axial portion having at least one axial surface extending generally axially and a radial portion having at least one radial surface extending generally radially, said axial and radial surfaces each being immediately adjacent the insert, said insert being between the annular lip and the outer case, said axial portion of said inner case being disposed between an outermost surface of said insert and said axial portion of said outer case.

20. A shaft seal comprising:
    an elastomeric annular body having an outwardly protruding annular lip;
    an annular outer case embedded into the body, the outer case includes a radial portion and an axial portion integrally formed as a unitary piece;
    an annular insert positioned immediately adjacent the radial portion of said outer case; and
    an annular inner case embedded into and in contact with the body adjacent the insert, the inner case includes a radial portion and an axial portion, wherein the radial and axial portions are positioned immediately adjacent the insert, the axial portion of the inner case extending over a majority of an axial length of the insert.

21. A shaft seal and shaft assembly including:

a body having a lip in contact with the shaft;

an outer case having an axial portion having radially inner and outer surfaces embedded into the body and a radial portion disposed against said body;

an insert provided immediately adjacent the radial portion of said outer case; and an inner case embedded into and in contact with the body and having an axial portion disposed immediately adjacent to an outermost surface of said insert, said axial portion extending over a majority of an axial length of said insert, and a radial portion disposed immediately adjacent to said insert opposite said radial portion of said outer case.

* * * * *